United States Patent [19]
Eastman et al.

[11] Patent Number: 5,431,529
[45] Date of Patent: Jul. 11, 1995

[54] ARTICULATED ARM TRANSFER DEVICE

[75] Inventors: Richard H. Eastman, Needham; James C. Davis, Jr., Carlisle, both of Mass.

[73] Assignee: Brooks Automation, Inc., Lowell, Mass.

[21] Appl. No.: 997,773

[22] Filed: Dec. 28, 1992

[51] Int. Cl.[6] .............................................. B25J 18/00
[52] U.S. Cl. ...................................... 414/744.5; 901/15; 901/21; 74/490.05; 74/490.06
[58] Field of Search .................. 414/744.5, 744.6, 749, 414/751; 901/15, 21; 74/479 BF, 479 BJ, 490.04, 490.05

[56] References Cited

U.S. PATENT DOCUMENTS

| | | | |
|---|---|---|---|
| 5,151,008 | 9/1992 | Ishida et al. | 901/15 X |
| 5,180,276 | 1/1993 | Hendrickson | 414/744.5 X |
| 5,333,986 | 8/1994 | Mizukami et al. | 414/217 |

FOREIGN PATENT DOCUMENTS 0292153  12/1990  Japan ................ 414/744.5

*Primary Examiner*—Donald W. Underwood
*Attorney, Agent, or Firm*—Nields & Lemack

[57] ABSTRACT

An articulated arm transfer device employs a pair of upper arms each upper arm being rotatable at its shoulder end, and a pair of forearms each forearm being rotatable at its wrist end. The elbow ends of each pair are connected to each other by a link means. The shoulder ends are mounted on a support in such a manner that one upper arm is rotated by a drive means, and holding means for an object to be transferred is mounted on the wrist ends. The link means includes shafts upon which the elbow ends are mounted and at least two S-bands connecting the shafts in such a manner that rotation of one shaft in either direction causes rotation of the other shaft in the opposite direction. The elbow end of one upper arm is fixed to its shaft, while the elbow end of the other upper arm is rotatably mounted on its shaft. The elbow end of one forearm is rotatably mounted on the shaft to which the elbow end of an upper arm is fixed, and the elbow end of the other forearm is fixed to the shaft on which the elbow end of the other upper arm is rotatably mounted.

10 Claims, 5 Drawing Sheets

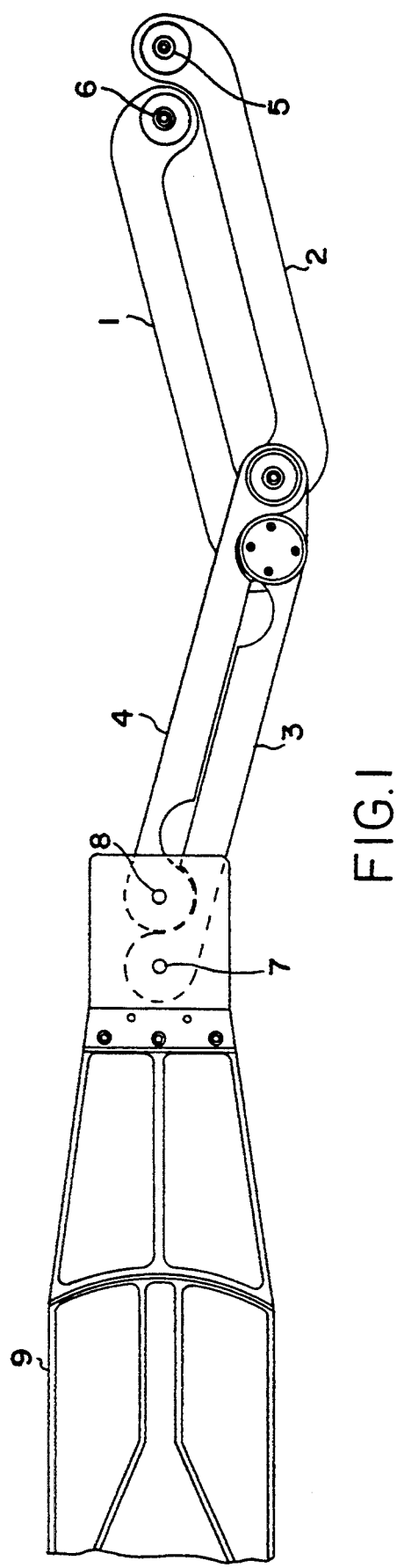
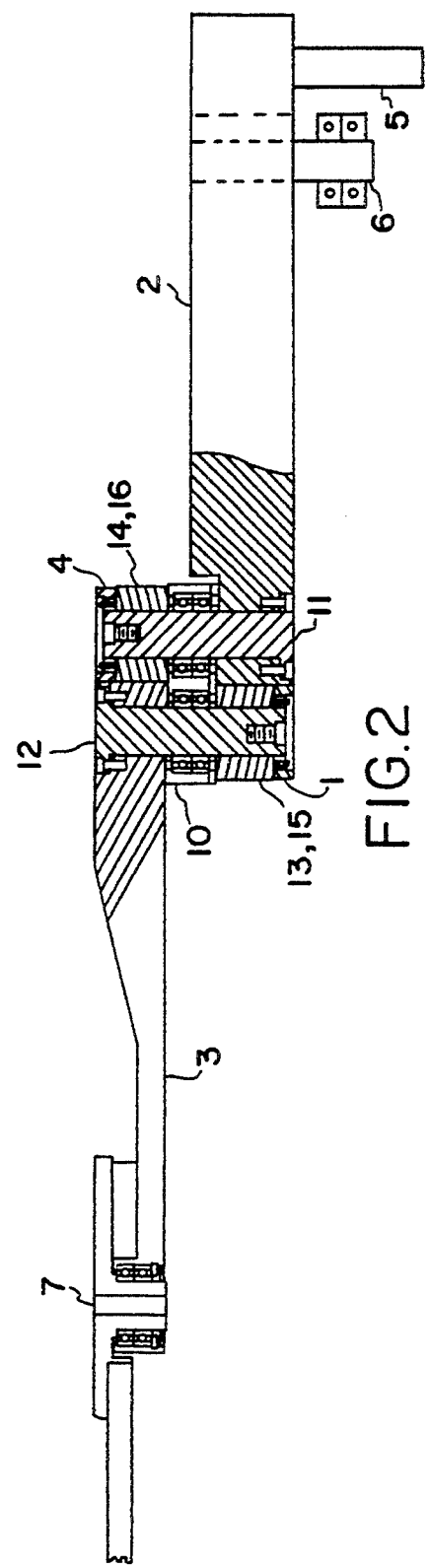

ARTICULATED ARM TRANSFER DEVICE

BACKGROUND OF THE INVENTION

1. Field of the Invention

The apparatus of the present invention relates generally to material transfer devices. The material transferred might include, but not be limited to, semiconductor wafers, such as Silicon and Gallium Arsenide, semiconductor packaging substrates, such as High Density Interconnects, semiconductor manufacturing process imaging plates, such as masks or reticles, and large area display panels, such as Active Matrix LCD substrates.

2. Description of the Prior Art

The transfer of delicate silicon wafers or the like between a plurality of work stations or locations in the manufacture of semiconductor devices presents unique handling problems. The silicon wafers are very delicate and have highly polished surfaces. When the wafers are abruptly moved, they tend to slide. This sliding action can cause the silicon wafers to abrade or alternatively can cause damage to their edges if they collide.

There are numerous devices described in the prior art for transferring silicon wafers. For example:

U.S. Pat. No. 3,823,836 discloses an apparatus which includes a supply carrier with a plurality of ledges to hold the silicon wafers and a withdrawal device having a vacuum chuck. The vacuum chuck is attached to an elevator which raises and lowers the chuck. A horizontal transfer arm coupled to the vacuum chuck is used to transfer the silicon wafer from the supply carrier to a desired work station.

U.S. Pat. No. 3,370,595 discloses a wafer transfer handling apparatus having an indexable carrier for transferring wafers to and from work stations. Wafers enter and leave the wafer carrier on an air slide with the aid of a wafer ejector acceptor arm having directional air jets. The wafer ejector acceptor arm controls the driving of the wafers into or out of the carrier from or onto the air slide, which moves the wafers to or from a work station.

U.S. Pat. Nos. 4,062,463, 3,874,525 and 4,028,159 also disclose wafer transfer devices which include either pneumatic components or gripping devices for handling the wafers.

U.S. Pat. Nos. 4,666,366 and 4,909,701 disclose wafer transfer handling apparatus having an articulated arm assembly which extends and retracts in a "froglike" motion to transfer an object such as a wafer between a plurality of locations. Two articulated arms are operatively coupled such that when one arm is driven by a motor the articulated arms extend and retract in a "froglike" or "frogkick" type of motion. A platform is coupled to the arms and has the object to be transferred disposed thereon.

U.S. Pat. No. 4,951,601 discloses wafer transfer handling apparatus having an articulated arm assembly which includes a dual four-bar link pivot mechanism. However, such mechanism is subject to certain arbitrary movement of the platform.

SUMMARY OF THE INVENTION

The present invention provides a simple and reliable device for transferring objects, such as silicon wafers, camera lenses, crystal oscillators, or the like, between a plurality of locations disposed in various axial and radial planes. This apparatus includes a dual four-bar link pivot mechanism having an improved link which prevents arbitrary movement of the platform. The link includes two shafts which are coupled so that one shaft rotates in the sense which is opposite to the sense of rotation of the other shaft.

The articulated arm assembly is preferably coupled to a base via a rotation motor such that the entire articulated arm assembly may be rotated in a radial plane. Like the apparatus of the prior art, such rotation is done when the end effector is not in an extended position.

The articulated arm assembly is also, in one embodiment, preferably coupled to the base via a plurality of flexures or levers that are responsive to a force such that the platform assembly may be displaced in an axial direction. In another embodiment, the arm assembly is mounted, by means other than flexures, for axial movement through a much larger range than that attainable with flexures. The assembly is adaptable for use in a variety of environments, including operation in a vacuum chamber or other controlled environment. The assembly may be mounted for movement inside a vacuum chamber with a vacuum seal between the assembly and its support.

BRIEF DESCRIPTION OF THE DRAWINGS

FIG. 1 is a plan view of an articulated arm assembly in accordance with the present invention in a left-extended position;

FIG. 2 is a side view (partly in a section) of the apparatus shown in FIG. 1;

FIG. 11A shows the upper arms at mid travel, FIG. 11B shows the forearms at mid travel, FIG. 12A shows the upper arms at full extend "A", FIG. 12B shows the forearms at full extend "A", FIG. 13A shows the upper arms at full extend "B" and FIG. 13B shows the forearms at full extend "B"

DETAILED DESCRIPTION OF THE INVENTION

Figure 3:
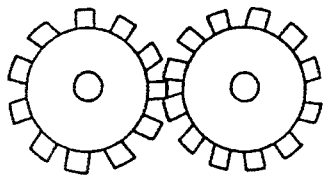
FIG. 3 is a top view of one form of link means for the apparatus of FIGS. 1 and 2.

The apparatus of the invention comprehends a four-arm lever connection which has been referred to as a sidewinder arm assembly.

Referring to the drawing, the four arms include an upper slave arm 1, an upper drive arm 2, a lower drive arm 3 and a lower slave arm 4. These four arms are supported upon various axles and shafts, as follows. A first end of the upper drive-arm 2 is fixed to a drive axle 6, so that rotation of the drive axle 6 will rotate the upper drive-arm 2. A first end of the upper slave arm 1 is rotatably mounted on a passive axle 5 which permits the upper slave arm 1 to rotate freely, either because the passive axle 5 is rotatably mounted in its socket or because the upper slave arm 1 is rotatably mounted on the passive axle 5.

A first end of the lower drive arm 3 is rotatably mounted on a passive axle 7, and a first end of the lower slave arm 4 is rotatably mounted on a passive axle 8. The passive axles 7 and 8 are mounted on an end effector 9 in such a way that the straight line through the passive axles 7 and 8 is parallel to the straight line through the axles 5 and 6. Free rotation-of the lower drive arm and the lower slave arm with respect to the end effector 9 is permitted, either because the passive axles 7 and 8 are rotatably mounted on the end effector 9 or because the lower arms are rotatably mounted on their respective passive axles.

The second ends of each of the four arms are mounted on a link 10 in the following manner. An upper shaft 11 and a lower shaft 12 are rotatably supported on the link 10. The second end of the upper drive-arm is fixed to the upper shaft 11, and the second end of the upper slave arm rotates on the lower shaft. As a result, when either one of the upper arms rotates in one sense (e.g. counter-clockwise), the essentially parallelogram configuration of the two upper arms causes the other upper arm to follow the rotational movement of the said one upper arm. In the embodiment of FIGS. 1 and 2 the upper drive-arm 2 is fixed to the drive axle 6, which is rotated by a suitable mechanism such as a gear driven by a toothed shaft of a motor. However, it is also possible to rotate the axle 5 by such a mechanism, the upper slave arm 1 being then fixed to the axle 5 while the upper drive-arm 2 is rotatably mounted on the axle 6; in that event, the upper arm 1 would be designated the "drive" arm and the upper arm 2 would be designated the "slave" arm. In other words, the term "drive" arm refers to an arm which is fixed to a shaft and thus participates in the connective action of the link 10, to be described hereinafter. The construction is such that the line joining the shafts remains parallel to the line joining the axles as rotation proceeds. The rotation of the upper drive arm in one sense (e.g. counter-clockwise) causes a similar rotation (counter-clockwise) about its own axis of the upper shaft, to which the upper drive arm is fixed.

The two shafts are connected by a connection which causes the lower shaft to rotate in a sense (e.g. clockwise) opposite to the sense of rotation of the upper shaft. In one embodiment of the invention this connection comprises the combination of a toothed wheel fixed to the upper shaft which meshes with a toothed wheel fixed to the lower shaft in a gear connection, as shown in FIG. 3. In another embodiment of the invention the two shafts are connected by two or more S-bands and wheels which are affixed to each of the shafts in the manner shown in FIGS. 4, 5 and 6. Two S-bands are required, one for each sense of rotation of the upper shaft, because the transfer of rotation to the lower shaft requires the action of an S-band in tension. Suitable materials for the S-bands include any spring alloy, i.e., any alloy for making springs. A preferred material is a spring steel alloy, and the most preferred material is the well-known alloy designated "ELGILOY", which is capable of being welded to other materials without cracking or warping. ELGILOY is a cobalt-nickel-iron alloy somewhat similar to the alloy known as "INCONEL".

The second end of the lower drive arm is fixed to the lower shaft, so that the lower drive arm is rotated (e.g. clockwise) as the lower shaft rotates. The second end of the lower slave arm is rotatably mounted on the upper shaft. The construction is such that the line joining the shafts remains parallel to the line joining the axles as rotation proceeds, and the essentially parallelogram configuration of the two lower arms causes the lower slave arm to rotate in synchronism with the lower drive arm.

As a result of the gear connection or S-band connection between the shafts, as the arms rotate the end effector is moved along the straight line through the passive axles 7,8. If all four arms have the same axle-to-shaft length, the end effector is moved along a line which runs through all four axles. If the length of the lower arms differs from that of the upper arms, the end effector is moved along a curved line but remains parallel to the line between the axles 5, 6.

Figure 4:
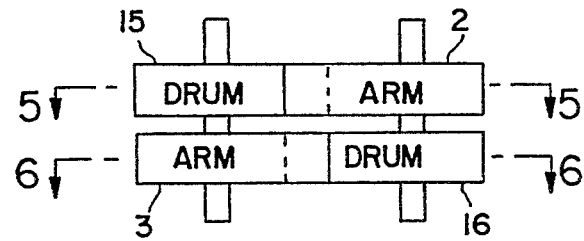
FIG. 4 is a side view of another form of link means for the apparatus of FIGS. 1 and 2.
Figure 5:
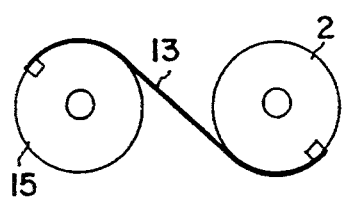
FIG. 5 is a section along the line 5—5 of FIG. 4.
Figure 6:
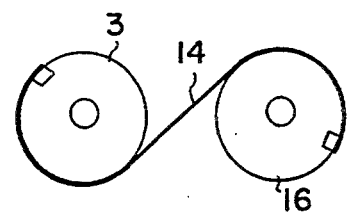
FIG. 6 is a section along the line 6—6 of FIG. 4.
Figure 7A:
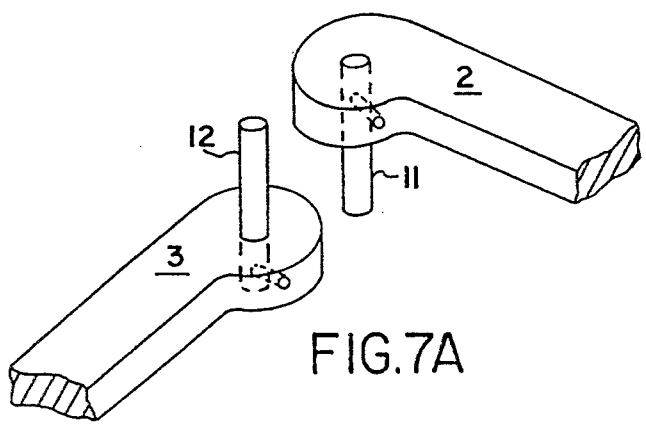
FIG. 7A is a sketch showing a first step in the assembly of the link means of FIGS. 4 through 6.
Figure 7B:
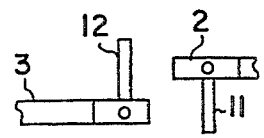
FIG. 7B is a sketch showing the link means of FIG. 7A from a different angle.
Figure 8A:
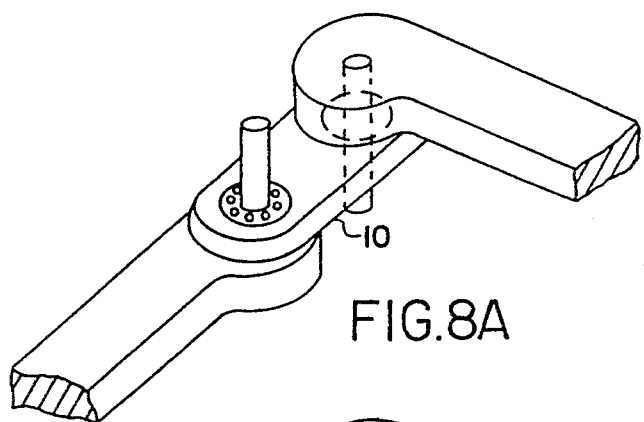
FIG. 8A is a sketch showing a second step in the assembly of the link means of FIGS. 4 through 6.
Figure 8B:
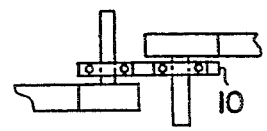
FIG. 8B is a sketch showing the link means of FIG. 8A from a different angle.
Figure 9A:
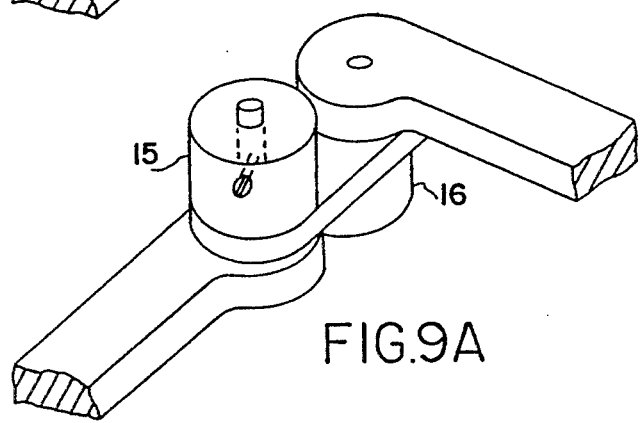
FIG. 9A is a sketch showing a third step in the assembly of the link means of FIGS. 4 through 6.
Figure 9B:
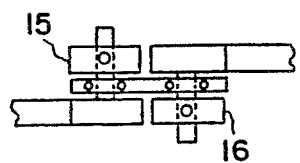
FIG. 9B is a sketch showing the link means of FIG. 9A from a different angle.
Figure 10A:
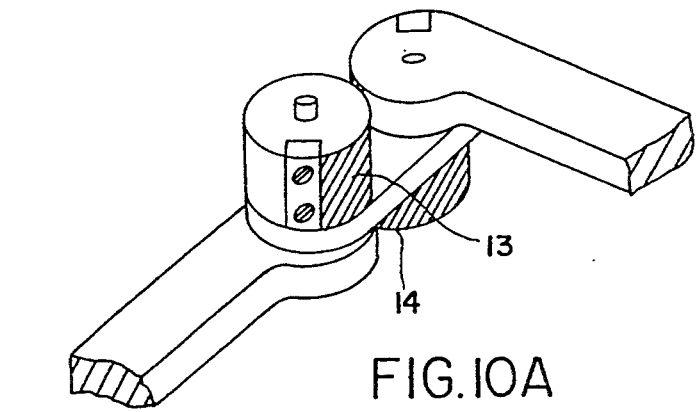
FIG. 10A is a sketch showing a fourth step in the assembly of the link means of FIGS. 4 through 6.
Figure 10B:
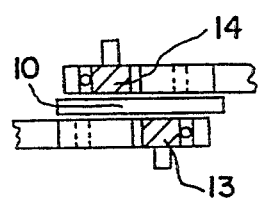
FIG. 10B is a sketch showing the link means of FIG. 10A from a different angle.

The assembly of the link means of FIGS. 4 through 6 is shown in FIGS. 7A, 7B, 8A, 8B, 9A, 9B, 10A and 10B. Referring thereto, a first step comprehends the affixing of the upper drive arm 2 to the upper shaft 11 and the affixing of the lower drive arm 3 to the lower shaft 12. (It should be noted that the view in FIG. 7A is that seen when the apparatus of FIGS. 1 and 2 is rotated about a horizontal axis 180 degrees, so that the upper drive arm 2 is above the upper slave arm 1 in FIG. 7A.) A second step is shown in FIGS. 8A and 8B and comprehends the placement of the link 10 upon the shafts 11 and 12. The link 10 is provided with bearings so that the shafts 11 and 12 may rotate with respect to the link 10. A third step is shown in FIGS. 9A and 9B and comprehends the placement of a lower drum 15 on the lower shaft 12 and the placement of an upper drum 16 on the upper shaft 11. The term "upper" refers to the shaft or drum which is nearest the shoulder axles 5 and 6, at least one of which provides the motive power, and the term "lower" refers to the shaft or drum which is the more remote from said shoulder axles 5 and 6 and nearer to the end effector 9. The lower drum 15 is affixed to the lower shaft 12, and the upper drum 16 is affixed to the upper shaft 11. Each drum is adjacent the end of a drive arm to which it is connected by a suitable band affixed at one end to the drum and at the other end to the drive arm. Extensions of each shaft are provided for the slave arm bearings. The band 14 which connects the lower drum to the upper drive arm may be designated a "clockwise" band, since clockwise rotation of the upper drive arm 2 places this band 14 in tension so as to rotate the lower drum 15 counterclockwise. The band 13 which connects the upper drum to the lower drive arm 3 may be designated a "counterclockwise" band, since counterclockwise rotation of the upper drive arm 2 places this band 13 in tension so as to rotate the lower drive arm 3 clockwise. Preferably the bands are always under some tension, since compression forces within the band are undesirable.

Figure 13A:
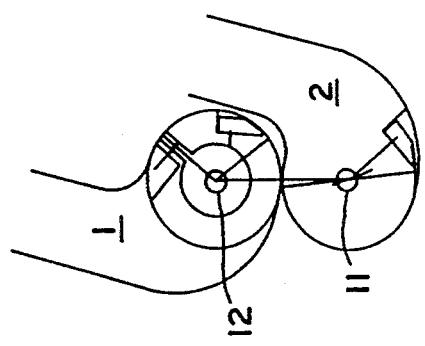
FIGS. 11A, 11B, 12A, 12B, 13A, and 13B are sketches showing the elbow band positions in the link means of FIGS. 4 through 6 during operation of the articulated arm assembly of FIGS. 1 and 2.
Figure 13B:
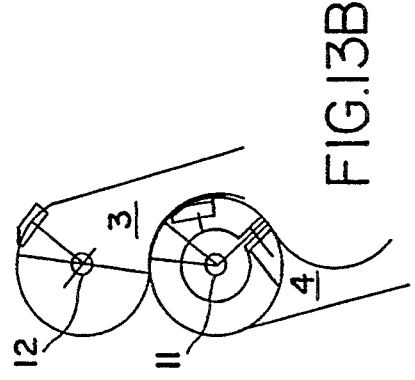
Figure 12A:
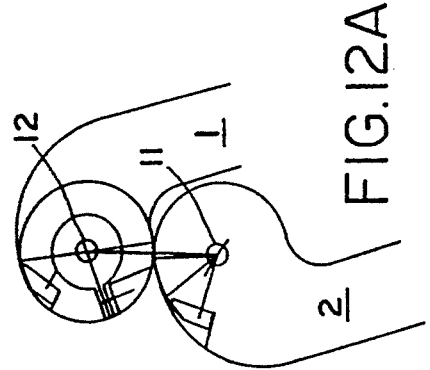
Figure 12B:
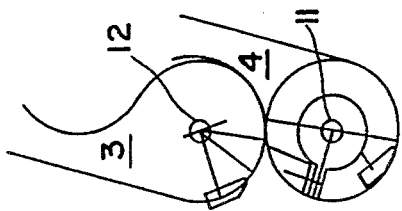
Figure 11A:
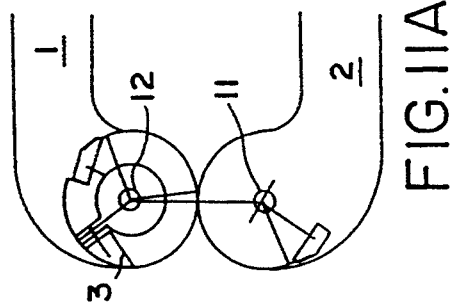
Figure 11B:
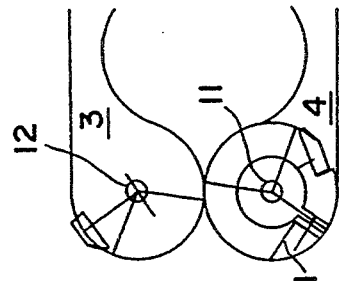

FIGS. 7–10 show only the drive arms, in order to clarify the description of the assembly of the link mechanism. The movement of the arms is shown in FIGS. 11–13, wherein FIGS. 11A, 12A and 13A each show the upper drive arm 2, the upper slave arm 1 and the lower drum 15 which, like the lower drive arm 3, is affixed or pinned to the lower shaft 12. The rotation of the drum 15 as between FIGS. 11A, 12A and 13A may be seen from the position of the band end mount thereon. FIGS. 11B, 12B and 13B each show the lower drive arm 3, the lower slave arm 4 and the upper drum 16 which, like the upper drive arm 2, is affixed or pinned to the upper shaft 11. The rotation of the drum 16 as between FIGS. 11B, 12B and 13B may be seen from the position of the band end mount thereon. Thus, FIGS. 11–13 show, not only the positions of the slave arms as well as the drive arms, but also the coaction of each band with one drum and one drive arm. The positions of the arms in FIGS. 12A and 12B correspond to the positions of these arms in FIG. 1, rather than the "inverse" view of FIGS. 7–10. As the end effector 9 of FIG. 1 is moved from the left side of the drawing to the right side of the drawing, the arms move sequentially through the positions shown in FIGS. 11A and 11B (mid travel) and the positions shown in FIGS. 13A and 13B.

Each band conveys the rotary motion of a drive arm or a drum to a drum or a drive arm, respectively. The link 10 causes each slave arm to follow the rotation of the corresponding drive arm about either the shoulder axles or the wrist axles, but any rotation of the shafts with respect to the slave arms is unrestricted, as a result of the bearings by which the slave arms are mounted on the extensions of the pivots.

Figure 14:
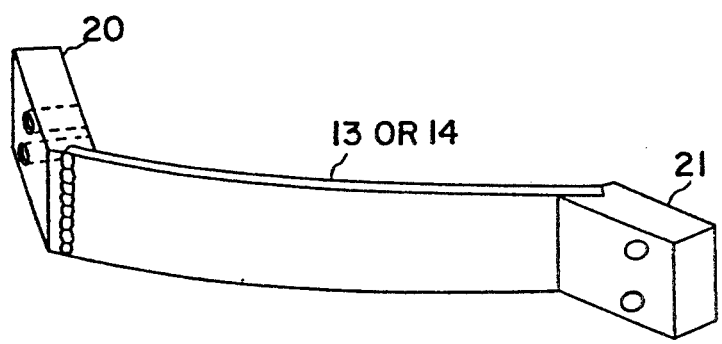
FIG. 14 is a sketch showing the band and band end mounts used in the link means of FIGS. 4 through 6.

As shown in FIG. 14, each end of each band is welded to a band end mount, which is then affixed to a drum or a drive arm by suitable pins, screws, or the like. During operation, the band which is under operational tension exerts tension upon the weld, which it is well-suited to sustain, and the band which is not under operational tension is preferably under at least some minimal tension, since compressive forces at the weld or within the band are to be avoided. Such minimal tension may be provided when each band end mount is affixed to its drum and drive arm.

Figure 15:
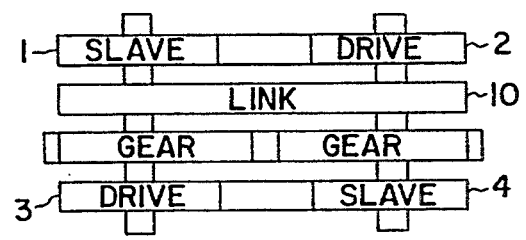
FIG. 15 is a sketch of the link means for the apparatus in FIG. 3.

It will be noticed from FIGS. 7–10 that each drive arm cooperates (with a drum) in transferring the rotation of one shaft to the rotation (in the opposite sense) of the other shaft. Therefore, as appears from FIGS. 7B, 8B, 9B and 10B, there are five levels of components supported on each shaft: namely, the upper slave arm 1 at a first level, the lower drum 15 and the upper drive arm 2 at a second level, the link 10 at a third level, the lower drive arm 3 and the upper drum 16 at a fourth level, and the lower slave arm 4 at a fifth level. Also, since each drive arm cooperates with a drum, the slave arm which is paired with a drive arm must be displaced to a level different from that occupied by the drive-arm/drum combination. When the gear mechanism of FIG. 3 is employed instead of the band/drum mechanism of FIGS. 4–6, each slave arm may occupy the same level as the drive arm with which it is paired, and the two gear wheels may occupy their own, separate level. This results in part from the fact that when the gear mechanism of FIG. 3 is employed, a single pair of gears can cause rotation in either sense. Therefore, as appears from FIG. 15, there are four levels of components supported on each shaft: namely, the upper drive arm 2 and upper slave arm 1 at a first level, the link 10 at a second level, the gears at a third level, and the lower drive arm 3 and lower slave arm 4 at a fourth level.

When the band/drum mechanism of FIGS. 4–6 is employed, one band/drum combination must be used for each sense of rotation, because each band can usefully operate only in tension. In order to reduce the number of levels required, it is convenient to affix one end of each band to the "elbow" end of a drive arm, rather than to another drum. When the gear mechanism of FIG. 3 is employed, it is not useful to form the elbow end of a drive arm as a gear wheel, because a greater saving of space is achieved by alloting separate gear wheels to their own level.

The essence of the link means is that each drive arm is affixed to a shaft, and a connection is provided which causes rotation of one shaft in one sense to cause rotation of the other shaft in the opposite sense.

Having thus described the principles of the invention, together with illustrative embodiments thereof, it is to be understood that although specific terms are employed, they are used in a generic and descriptive sense and not for purposes of limitation, the scope of the invention being set forth in the following claims.

We claim:

1. An apparatus for transferring objects, comprising:
   a support;
   a first upper arm supported on said support so as to be rotatable about a first axis;
   a second upper arm supported on said support so as to be rotatable about a second axis;
   a pair of forearms, comprising a first forearm and a second forearm, said pair of forearms being articulated to said first and second upper arms by means of link means;
   said link means comprising a link, an upper shaft rotatably supported on said link and having a drum fixed thereto, and a lower shaft rotatably supported on said link and having a drum fixed thereto;
   said first upper arm being fixed to said upper shaft;
   said second upper arm being rotatably mounted on said lower shaft;
   said first forearm being fixed to said lower shaft;
   said second forearm being rotatably mounted on said upper shaft;
   crossed S-bands of which one extends between said drum on said upper shaft and said first forearm and of which the other extends between said drum on said lower shaft and said first upper arm;
   holding means pivotally coupled to said pair of forearms; and
   means for driving at least one of said upper arms for rotation through an angle in the range of from greater than 120° up to and including 180° to move said holding means between an extended position and a retracted position.

2. Apparatus for transporting an article, comprising in combination:
   a support;
   a first shoulder pivot supported on said support and defining an axis of rotation, a second shoulder pivot substantially parallel to said first shoulder pivot and supported on said support and together with said first shoulder pivot defining a first straight line passing through said first and second shoulder pivots extending across said support, a first upper arm rotatably mounted on said first shoulder pivot and having first elbow joint means comprising at least one first elbow pivot fixed to said first upper arm and spaced from said first shoulder pivot by said first upper-arm length, said first elbow pivot having a first drum fixed thereto, a second upper arm rotatably mounted on said second shoulder pivot and having second elbow joint means comprising at least one second elbow pivot rotatably connected to said second upper arm and spaced from said second shoulder pivot by said second upper-arm length, said second elbow pivot having a second drum fixed thereto, a first forearm fixed to said second elbow pivot and having a first wrist pivot spaced from said second elbow pivot by said first forearm length, a second forearm rotatably mounted on said first elbow pivot and having a second wrist pivot spaced from said first elbow pivot by said second forearm length, said second wrist pivot together with said first wrist pivot defining a second straight line passing through said first and second wrist pivots and parallel to said first straight line, a holding means mounted on said wrist pivots, link means connecting said elbow pivots, crossed S-bands of which one extends between said first drum and said first forearm and of which the other extends between said second drum and said first upper arm, and means for driving at least one of said upper arms for rotation through an angle in the range of from greater than 120° up to and including 180° to move said holding means between an extended position and a retracted position.

3. An assembly comprising: (a) an end effector, (b) a pair of upper arms each having a shoulder end and an elbow end, (c) a pair of forearms each having a wrist end and an elbow end, and (d) a support, the elbow ends of said upper arms being connected to the elbow ends of said forearms by link means, the wrist ends of said forearms being mounted to the end effector and the shoulder ends of said upper arms being mounted to the support, said link means including a first shaft having a first drum fixed thereto and rotatably connected to the elbow end of one forearm and fixed to the elbow end of one upper arm, said link means including a second shaft having a second drum fixed thereto and rotatably connected to the elbow end of the other upper arm and fixed to the elbow end of the other forearm, crossed S-bands of which one extends between said first drum and the elbow end of the forearm to which said second shaft is fixed and of which the other extends between said second drum and the elbow end of the upper arm to which said first shaft is fixed; and means for imparting R and θ movement to the end effector via the upper arms and forearms.

4. An apparatus for transferring objects, comprising:

a support having a first axle and a second axle adjacent to said first axle;

a first upper arm having a shoulder end and an elbow end, said shoulder end being rotatably supported on said first axle;

a second upper arm having a shoulder end and an elbow end, said shoulder end being rotatably supported on said second axle;

an end effector having a first axle and a second axle adjacent to said first axle;

a first forearm having a wrist end and an elbow end, said wrist end being rotatably attached to said first axle of said end effector;

a second forearm having a wrist end and an elbow end, said wrist end being rotatably attached to said second axle of said end effector;

link means, said link means comprising (1) a link having a first aperture, a second aperture adjacent to said first aperture, a first side and a second side, (2) an upper shaft having a first drum fixed thereto and rotatably supported within said first aperture, and (3) a lower shaft having a second drum fixed thereto and rotatably supported within said second aperture;

said elbow end of said first upper arm being fixed to said upper shaft on said first side of said link;

said elbow end of said first forearm being fixed to said lower shaft on said second side of said link;

said elbow end of said second upper arm being rotatably mounted on said lower shaft on said first side of said link;

said elbow end of said second forearm being rotatably mounted on said upper shaft on said second side of said link;

crossed S-bands of which one extends between said first drum and said elbow end of said first forearm and of which the other extends between said second drum and said elbow end of said first upper arm; and means for driving at least one of said upper arms for rotation through an angle in the range of from greater than 120° up to and including 180° to move said end effector between an extended position and a retracted position.

5. An apparatus in accordance with claim 1, wherein said S-bands consist essentially of a spring steel alloy.

6. An apparatus in accordance with claim 5, wherein said spring steel alloy is a cobalt-nickel-iron alloy.

7. Apparatus in accordance with claim 1, wherein said means for driving at least one of said upper arms drives said first upper arm.

8. Apparatus in accordance with claim 2, wherein said means for driving at least one of said upper arms drives said first upper arm.

9. Apparatus in accordance with claim 3, wherein said means for imparting R and θ movement includes means for driving the upper arm the elbow end of which is fixed to said first shaft.

10. Apparatus in accordance with claim 4, wherein said means for driving at least one of said upper arms drives said first upper arm.

* * * * *